United States Patent [19]

Richmond et al.

[11] 4,243,452
[45] Jan. 6, 1981

[54] METHOD AND APPARATUS FOR MAKING WRAPPED, MOLDED, TOOTHED BELTS

[75] Inventors: Kenneth D. Richmond; Joseph P. Miranti, Jr., both of Nixa; Dewey D. Henderson, Springfield, all of Mo.

[73] Assignee: Dayco Corporation, Dayton, Ohio

[21] Appl. No.: 75,612

[22] Filed: Sep. 14, 1979

[51] Int. Cl.³ .............................................. B29H 7/22
[52] U.S. Cl. .................................. 156/138; 474/242; 156/140; 156/142; 264/314; 264/325; 425/28 B; 425/34 B
[58] Field of Search ............... 156/138, 140, 141, 142, 156/137, 139, 245, 500, 416, 417; 74/232, 233, 234; 264/326, 325, 314, 315; 249/65; 425/28 B, 34 B, 47, 50, 49, 52, 51, 53, DIG. 14, DIG. 19, 56, 55

[56] References Cited
U.S. PATENT DOCUMENTS

| | | | |
|---|---|---|---|
| 2,253,792 | 8/1941 | Leavenworth | 264/315 |
| 2,671,244 | 3/1954 | Freedlander | 425/28 B |
| 3,800,610 | 4/1974 | Wach | 74/233 |
| 4,184,822 | 1/1980 | Schwabauer | 425/28 B |

Primary Examiner—Michael W. Ball
Attorney, Agent, or Firm—Charles E. Bricker

[57] ABSTRACT

An improved ring molding apparatus for molding toothed V-belts is provided which comprises, in one embodiment, a ring mold having an outer circumferential surface which is grooved to provide a mating surface for a bladder having an inner surface having a plurality of tooth-forming projections and recesses. According to another embodiment, the bladder has a plurality of axially-running projections and recesses arranged in an annulus for each of the mold cavities. Also provided is a method for making molded V-belts which comprises curing the belt in the above molds.

15 Claims, 10 Drawing Figures

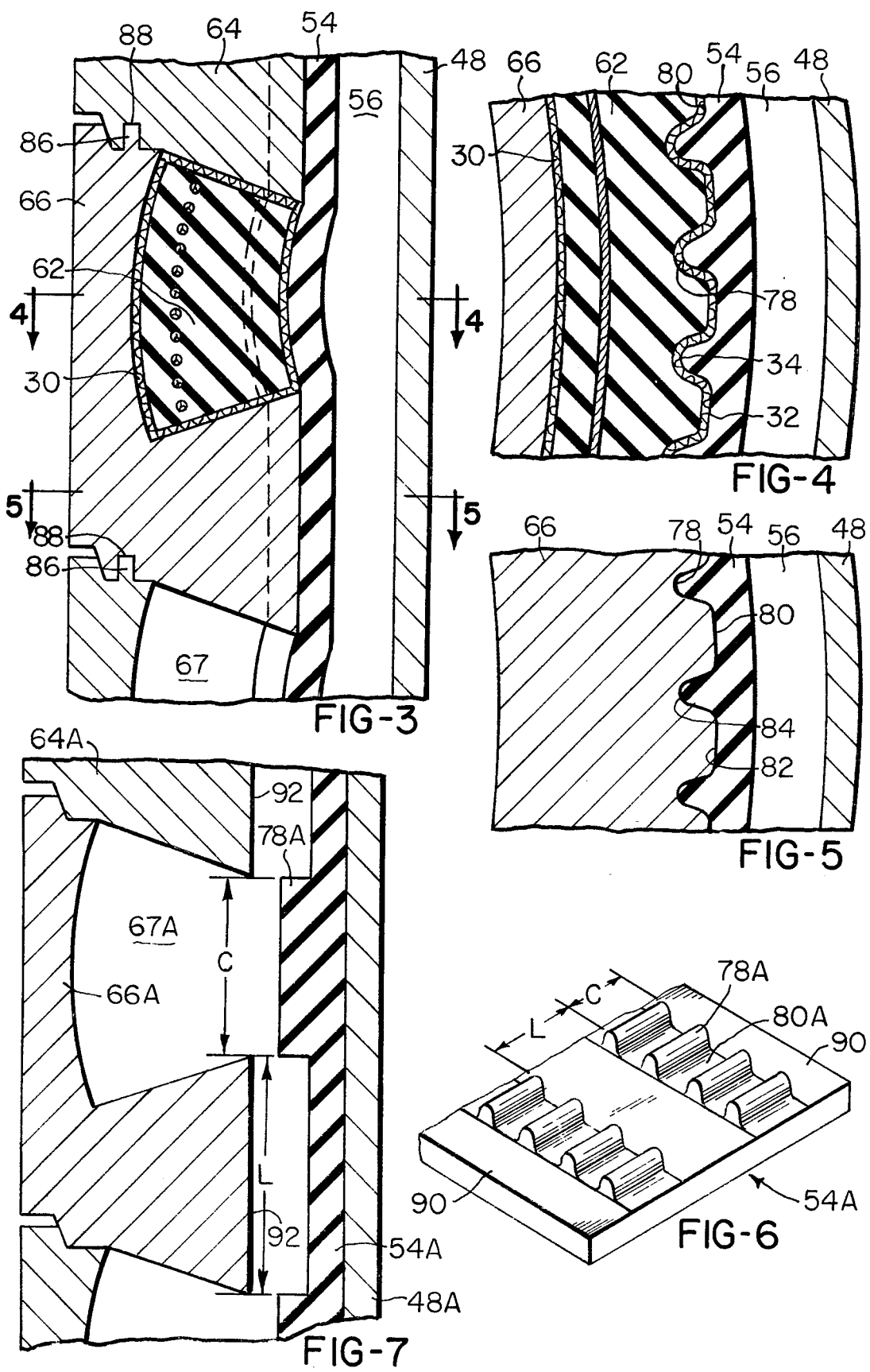

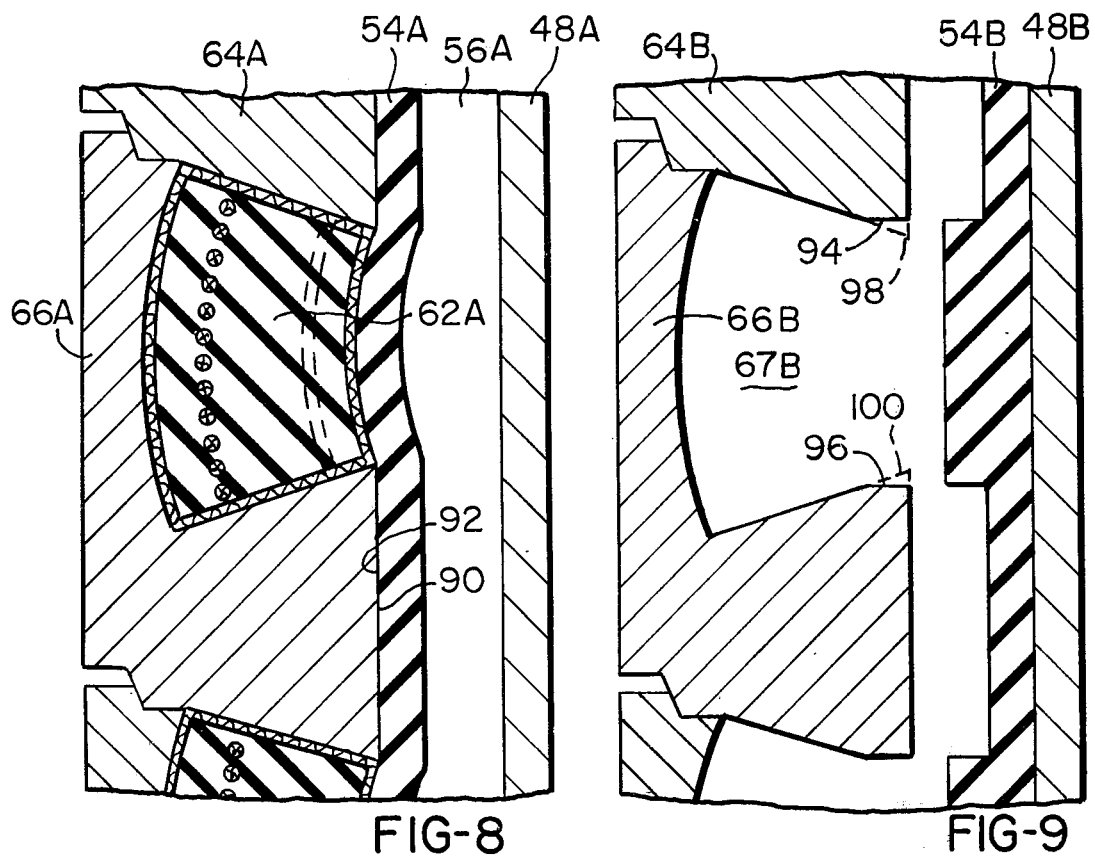
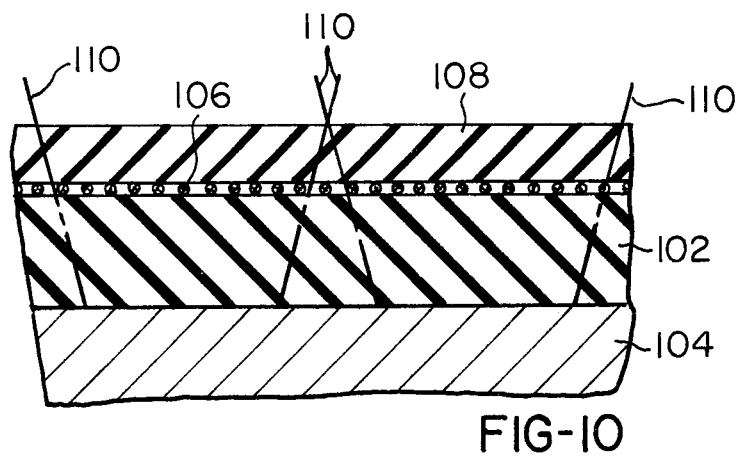

METHOD AND APPARATUS FOR MAKING WRAPPED, MOLDED, TOOTHED BELTS

BACKGROUND OF THE INVENTION

This invention relates to wrapped, molded, toothed belts. In one aspect, it relates to a method for making such belts. In another aspect, it relates to an apparatus for making such belts.

Heretofore, wrapped, molded endless power transmission belts have been vulcanized or cured by placing them in a segmented cylindrical mold that confines the side portions of the belt and either the base or the top of the belt, whereas the remaining portion of the belt is exposed. The outer surfaces of the belts are then confined and the belts are forced into the mold, either by a spiralled wrapping tape placed around the outer surface of the cylindrical mold, or by a rubber sleeve, such as that described in U.S. Pat. No. 2,883,701. It is known that these belts can be provided with teeth by inserting a matrix into the ring mold, and after curing the belt, separating the matrix and the toothed belt. This operation is both tedious and expensive, as well as not being entirely satisfactory in that the matrix must be accurately placed in order to provide satisfactory teeth in the finished belt.

Accordingly, it is an object of the present invention to provide an improved method for making wrapped, molded toothed endless power transmission belts.

It is another object of the present invention to provide an apparatus for making wrapped, molded, toothed endless power transmission belts.

Other objects, aspects and advantages of the present invention will be apparent to those skilled in the art from a reading of the following detailed disclosure, the appended claims and the attached drawings.

DETAILED DESCRIPTION OF THE DRAWINGS

The features of the invention will be better understood from a consideration of the following description taken in conjunction with the accompanying drawings in which:

FIG. 3 is a partial blown-up view of a portion of one form of a curing bladder and mold ring;

FIG. 4 is a cross section taken along lines 4—4 of FIG. 3;

FIG. 5 is a cross section taken along lines 5—5 of FIG. 3;

FIG. 6 is a partial elevational view of another form of curing bladder;

FIG. 7 is a partial blown-up view of a portion of the bladder of FIG. 6 and a mold ring showing the bladder in the relaxed position;

FIG. 8 is a partial blown-up view of the apparatus shown in FIG. 7 with the bladder in the tooth-forming position;

FIG. 9 is a partial blown-up view showing the bladder of FIG. 6 in use with modified mold rings; and FIG. 10 is a cross-sectional view illustrating the construction of a belt sleeve.

DESCRIPTION OF THE PREFERRED EMBODIMENTS

Figure 1:
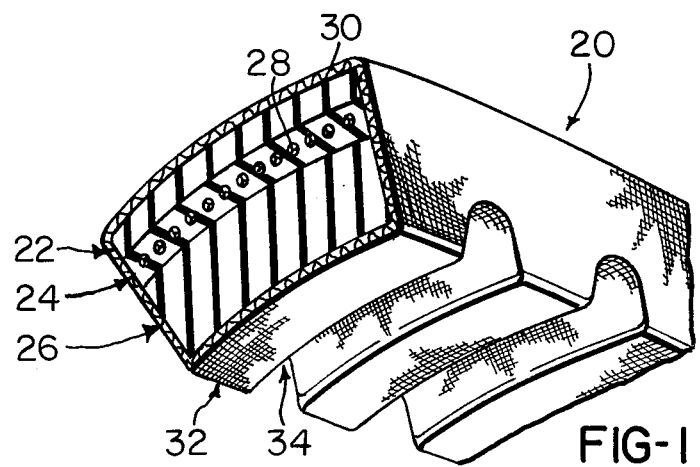
FIG. 1 is a perspective, sectional view of a belt made in accordance with the present invention.

With reference to the drawings, and in particular FIG. 1, there is illustrated a wrapped, molded, toothed V-belt construction generally indicated at 20 which comprises a tension section 22, a load-carrying section 24 and a compression section 26. The load-carrying section 24 is comprised of a helically wound, load-carrying cord 28. The entire belt structure is wrapped with a rubber-impregnated fabric envelope 30 that is shown as a single ply but may well be multiple plies and may be composed of either tire cord fabric or a square-woven fabric. The belt has a plurality of projections 32 and recesses 34 in the compression section which define the teeth of the belt. The recesses 34 are of substantially uniform depth across the entire width of the belt 20.

Figure 2:
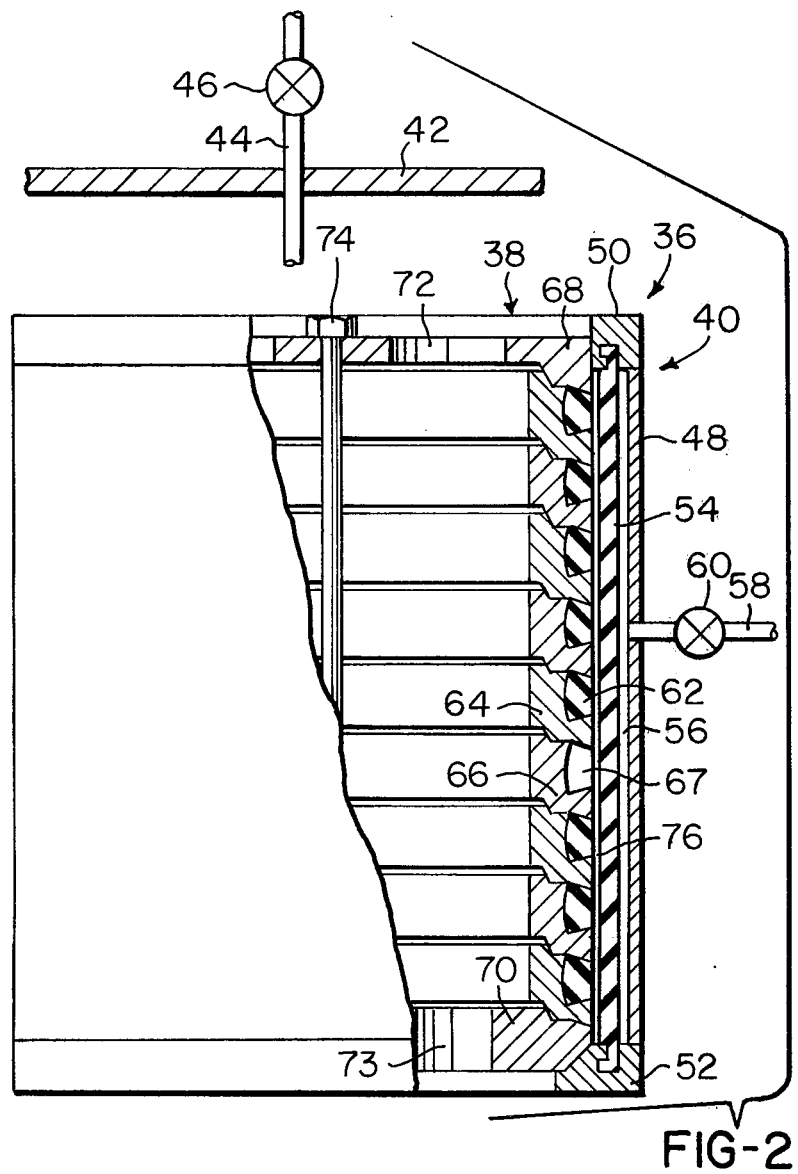
FIG. 2 is an elevational partial sectional view of a cylindrical molding apparatus.

FIG. 2 depicts a mold, indicated generally at 36, which may be used for making the belt 20. The mold 36 comprises a cylindrical inner assembly 38 and a cylindrical outer assembly 40. The entire mold assembly may be suitably disposed within a curing chamber 42 or similar sealed vulcanizing kettle or autoclave to which is supplied steam or other suitable curing medium through conduit 44, controlled by valve 46.

The outer mold assembly 40 includes an outer cylinder 48, the ends of which are attached to upper and lower end rings 50 and 52, respectively. The end rings 50 and 52 define means within which is securely attached marginal portions of an inflatable bladder 54, also known in the art as an air bag or diaphragm. The ends of the bladder are thus sealed to the cylinder 48 at its upper and lower ends, defining a variable volume pressure chamber 56 therebetween. The pressure chamber 56 is pressurizable from conduit 58, regulated by valve 60. The pressure obtainable within the pressure chamber 56, as supplied through conduit 58, is virtually independent of the pressure existing within the vulcanizing chamber 42.

The inner mold assembly 38 is concentric with and nests within the outer assembly 40. The inner assembly, shown holding a plurality of belt bodies 62, comprises a plurality of nestable rings 64 and 66, whose surfaces define a belt cavity 67 for reception of an individual uncured belt body 62. The inner assembly further comprises an enclosure plate 68 and 70 each having openings 72 and 73, respectively therein. The inner assembly 38 is held together by a threaded bolt 74. An annular space 76 is provided between the inner assembly 38 and the outer assembly 40 to allow insertion of the inner assembly into the outer assembly.

Referring now to FIGS. 3–5, and according to one embodiment of the present invention, the bladder 54 is provided with a plurality of projections 78 and recesses 80 and the mold rings 64 and 66 are provided with projections 82 and recesses 84. The projections 78 mate with the recesses 84 of the mold rings, and the recesses 80 of the bladder mate with the projections 82 of the mold rings. The projections 78 of the bladder thus form the recesses 34 of the belt 20, while the recesses 80 of the bladder form the teeth, or projections 32 of the belt 20. Alignment means, such as the pins 86, which mate with the holes 88, may be provided between the rings 64, 66, and between the end closure plate 70 and the rings to align the mold projections 82 and recesses 84 between all the mold rings 64, 66 and to align the mold projections 82 and recesses 86 with the mating bladder recesses 80 and projections 78, respectively.

Other exemplary embodiments of the apparatus of this invention are shown in FIGS. 6–9 of the drawing. The apparatus shown in FIGS. 6–9 is similar to the apparatus shown in FIGS. 2–5; therefore, the parts of such apparatus will be designated by the same reference numerals, followed by the latter designations A or B and not described again in detail.

In accordance with another embodiment of the present invention, and as shown in FIGS. 6–8, the bladder 54A comprises a plurality of projections 78A and recesses 80A. The bladder 54A differs from the bladder 54 in that the projections 78 and recesses 80 run approximately the full axial length of the latter, whereas in the bladder 54A portions 90 of the bladder of width L are removed, leaving rings of projections 78A and recesses 80A of width C. The width C of these rings is approximately equal to the width of the opening of the cavity 67A, while the width L between such rings is approximately equal to the width of the land 92 between the cavities 67A. The removed portions 90 allow the bladder 54A, when in the inflated, or pressurized, state, as shown in FIG. 8, to lie flat against the land 92. Thus, the mold rings 64A, 66A may be conventional mold rings, having a circular outer circumferential surface, otherwise designated as land 92.

Yet another embodiment of the present invention is shown in FIG. 9. According to this embodiment, the mold rings 64B and 66B have parallel flat surfaces 94 and 96 at the opening of the cavity 67B, provided by removing portions 98 and 100, respectively, from the mold rings 66B and 64B, respectively. These flat surfaces 94 and 96 provide better alignment of the ribbed portion of the bladder 54B with the opening of the cavity 67B.

Endless power transmission belts to be molded and cured by the mold apparatus of this invention are separately assembled and wrapped in a conventional manner. For example, as shown in FIG. 10, one or more plies of elastomeric material 102 and/or fabric are built up on a building lathe or drum 104 and a load-carrying section is applied between certain of the layers, generally by spirally winding a tensile cord 106, followed by another layer of elastomeric material 108, thus forming a belt sleeve. Individual belt bodies are cut from the belt sleeve as indicated at 110 and the individual belt bodies are wrapped with at least one fabric cover in a conventional manner, to provide the wrapped belt bodies 62.

In carrying out the method of this invention, the inner assembly 38 is first removed from the mold 36, and disassembled, then reassembled with the individual wrapped belt bodies 62 in each of the cavities 67. The inner assembly 38 with the belt bodies 62 loaded therein is reinserted within the outer mold assembly 40 and the curing chamber 42 is closed.

The curing step requires sufficient heat for a sufficient period of time to vulcanize or cure the belt bodies 62. Sufficient pressure is required within the pressure chamber 56 to mold the teeth into the compression section 26 of the belt 20 and this pressure is maintained throughout the curing of the belt body. A heat and pressure source, such as steam, may be supplied by way of conduit 58 to expand the bladder 54 against the belt bodies 62. Prior to, simultaneously, or after pressurizing the bladder 54, a heat and pressure source, such as steam, is admitted through conduit 44 into the curing chamber 42. Upon curing, the completed belts 20 are removed from the mold by first removing the inner mold assembly and then disassembling this assembly. It may be desirable to cool the inner mold assembly prior to removing the completed belts therefrom. Cooling may be carried out by exposure to the atmosphere at ambient temperature or by immersing the inner mold assembly in a tank of cool fluid, such as water.

Although the apparatus of the present invention has been illustrated and described as being an external pressure apparatus, i.e., having the bladder and pressure chamber surrounding the mold rings, it will be apparent to those skilled in the art that an internal pressure apparatus may also be employed, i.e., wherein the mold rings surround the bladder and pressure chamber. Similarly, the process of the present invention may be carried out using an external pressure apparatus or an internal pressure apparatus.

Various other embodiments of this invention and methods of practicing the same will be apparent to those skilled in the art from the foregoing disclosure and it will be recognized that this invention may be otherwise practiced without departing from the spirit and scope of the following claims.

We claim:

1. In a process for producing a molded V-belt having a tension section, a load-carrying section, and a compression section, said compression section having a plurality of projections and recesses therein, which comprises the steps of providing an uncured belt body and curing said belt body in a ring mold having at least one belt molding cavity within and between the rings of said mold for receiving the outer periphery and sides of said belt body, said cavity having one open side whereby the inner periphery of said belt body is exposed, said ring mold also having in association therewith means for confining said belt body within said cavity and for applying pressure to said inner periphery of said belt body, the improvement which comprises:
   (a) providing an uncured belt body;
   (b) assembling said belt body upon a ring mold having at least one cavity within and between the rings of said mold for receiving the outer periphery and sides of said belt body, said cavity having one open side whereby the inner periphery of said belt body is exposed, said mold having a plurality of axially-running projections and recesses in the circumferential surface of said mold having said cavity opening, said ring mold also having an expandable elastomeric sleeve in association therewith, said sleeve having a plurality of axially-running recesses and projections which align and mate with said projections and recesses, respectively, of said mold when said sleeve is inflated;
   (c) expanding said sleeve, thereby applying molding pressure upon said inner periphery of said belt body; and,
   (d) curing said belt body.

2. The method of claim 1 wherein said uncured belt body is provided by the steps comprising wrapping a first layer of an elastomeric material around a building drum, placing a continuous strength cord around said first layer, and wrapping a second layer of elastomeric material around said cord thereby forming a belt sleeve, and cutting said sleeve into at least one belt body.

3. The method of claim 2 further comprising the step of wrapping said belt body with a fabric cover.

4. In a process for producing a molded V-belt having a tension section, a load-carrying section, and a compression section, said compression section having a plurality of projections and recesses therein, which comprises the steps of providing an uncured belt body and curing said belt body in a ring mold having at least one belt molding cavity within and between the rings of said mold for receiving the outer periphery and sides of said belt body, said cavity having one open side whereby the inner periphery of said belt body is exposed, said ring mold also having in association therewith means for confining said belt body within said cavity and for applying pressure to said inner periphery of said belt body, the improvement which comprises:

(a) providing an uncured belt body;

(b) assembling said belt body upon a ring mold having at least one cavity within and between the rings of said mold for receiving the outer periphery and sides of said belt body, said cavity having one open side whereby the inner periphery of said belt body is exposed, said ring mold also having an expandable elastomeric sleeve in association therewith, said sleeve having a plurality of axially-running projections and recesses arranged in at least one annulus having an axial width approximately equal to the width of said opening in said cavity;

(c) expanding said sleeve, thereby applying molding pressure through said annulus upon said inner periphery of said belt body; and (d) curing said belt body.

5. The method of claim 4 wherein said uncured belt body is provided by the steps comprising wrapping a first layer of an elastomeric material around a building drum, placing a continuous strength cord around said first layer, and wrapping a second layer of elastomeric material around said cord, thereby forming a belt sleeve, and cutting said sleeve into at least one belt body.

6. The method of claim 5 further comprising the step of wrapping said belt body with a fabric cover.

7. In an apparatus for molding endless belts comprising:

(a) a plurality of stacked mold rings forming the inner peripheral walls and side walls of annular cavities within and between said rings for receiving the outer peripheries and sides, respectively, of individual belts, the outer periphery of said cavity extending between said side walls, being open whereby the entire inner peripheries of said belts are exposed;

(b) means for clamping said rings together;

(c) a substantially cylindrical elastomeric sleeve positioned in association with said rings and adapted to close the entire peripheral openings of said cavities and to contact the entire inner peripheries of said belts;

(d) a substantially cylindrical metal sleeve positioned in association with said elastomeric sleeve;

(e) means for sealing the ends of said elastomeric sleeve to said metal sleeve to provide an expansion chamber therebetween; and, (f) means for admitting a fluid under pressure into said expansion chamber;

the improvement comprising a plurality of axially running projections and recesses on the mold-contacting surface of said elastomeric sleeve and a plurality of mateable recesses and projections in the sleeve-contacting peripheral surfaces of said mold rings, wherein said projections and recesses of said elastomeric sleeve mate with said recesses and projections, respectively, of said mold rings when said elastomeric sleeve is expanded into contact with said rings.

8. The apparatus of claim 1 wherein the spacing between said projections of said elastomeric sleeve and, concurrently, said mating recesses of said mold rings is substantially uniform.

9. The apparatus of claim 7 wherein the spacing between said projections of said elastomeric sleeve and, concurrently, said mating recess of said mold rings is non-uniform.

10. The apparatus of claim 7 further comprising alignment means for aligning said projections and recesses in the outer peripheral surfaces of said mold rings.

11. The apparatus of claim 7 further comprising alignment means for aligning said recesses and projections in said elastomeric sleeve with said projections and recesses, respectively, in said mold rings.

12. In an apparatus for molding endless belts comprising:

(a) a plurality of stacked mold rings forming the inner peripheral walls and side walls of annular cavities within and between said rings for receiving the outer peripheries and sides, respectively, of individual belts, the outer periphery of said cavity, extending between said side walls, being open whereby the entire inner peripheries of said belts are exposed;

(b) means for clamping said rings together;

(c) a substantially cylindrical elastomeric sleeve positioned in association with said rings and adapted to close the entire peripheral openings of said cavities and to contact the entire inner peripheries of said belts;

(d) a substantially cylindrical metal sleeve positioned in association with said elastomeric sleeve;

(e) means for sealing the ends of said elastomeric sleeve to said metal sleeve to provide an expansion chamber therebetween; and, (f) means for admitting a fluid under pressure into said expansion chamber;

the improvement comprising a plurality of axially running projections and recesses arranged in an annulus for each of said cavities, said annulus having an axial width approximately equal to the width of said opening in the outer periphery of said cavity.

13. The apparatus of claim 12 wherein the spacing between said projections in said elastomeric sleeve is substantially uniform.

14. The apparatus of claim 12 wherein the spacing between said projections in said elastomeric sleeve is non-uniform.

15. The apparatus of claim 12 wherein the side walls of each of said cavities have a radially flat portion adjacent to said opening in the outer periphery of said cavity.

* * * * *